Dec. 13, 1949     H. CROONBORG     2,491,001
GARMENT

Filed April 13, 1946     5 Sheets-Sheet 1

HAROLD CROONBORG
INVENTOR.

BY
ATTORNEY

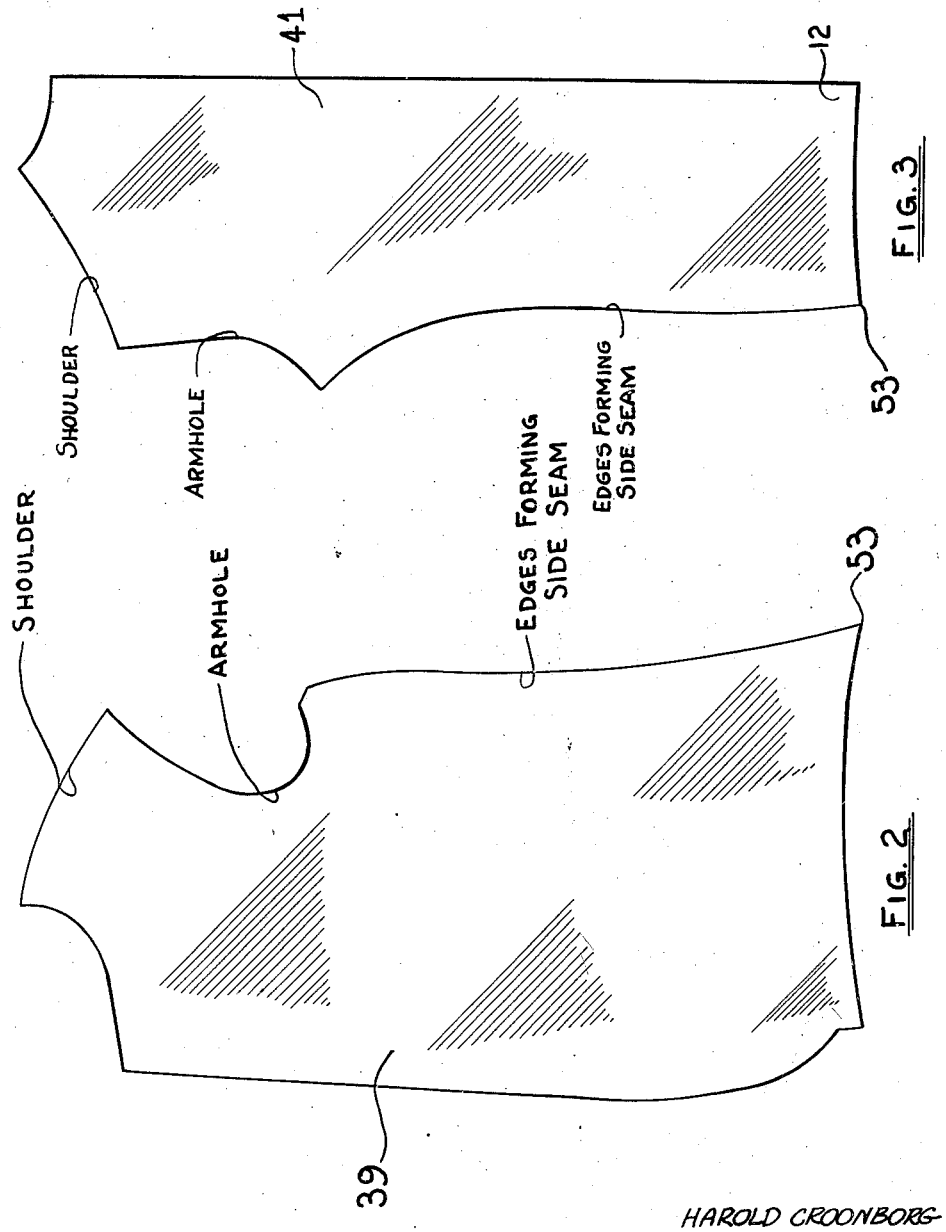

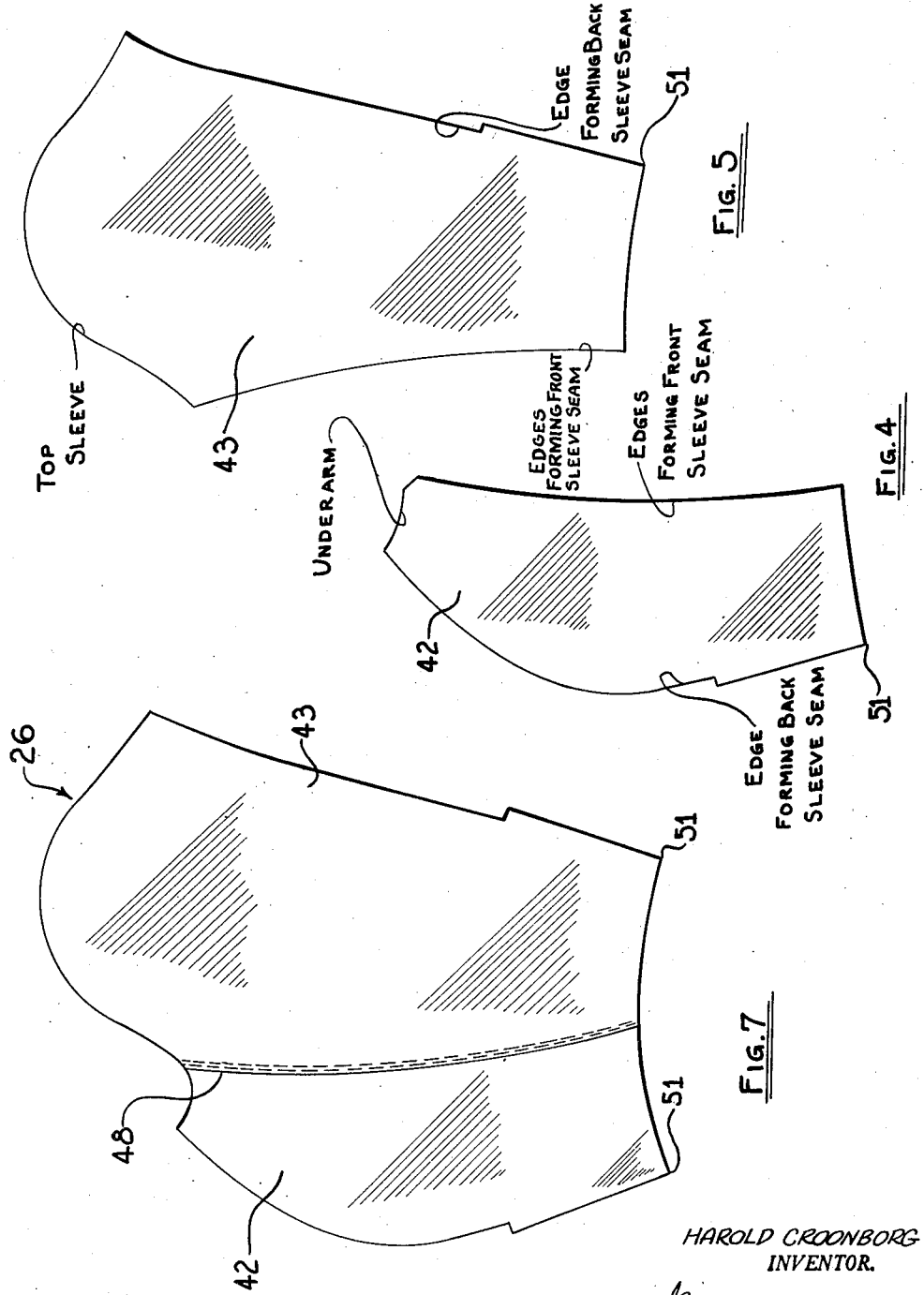

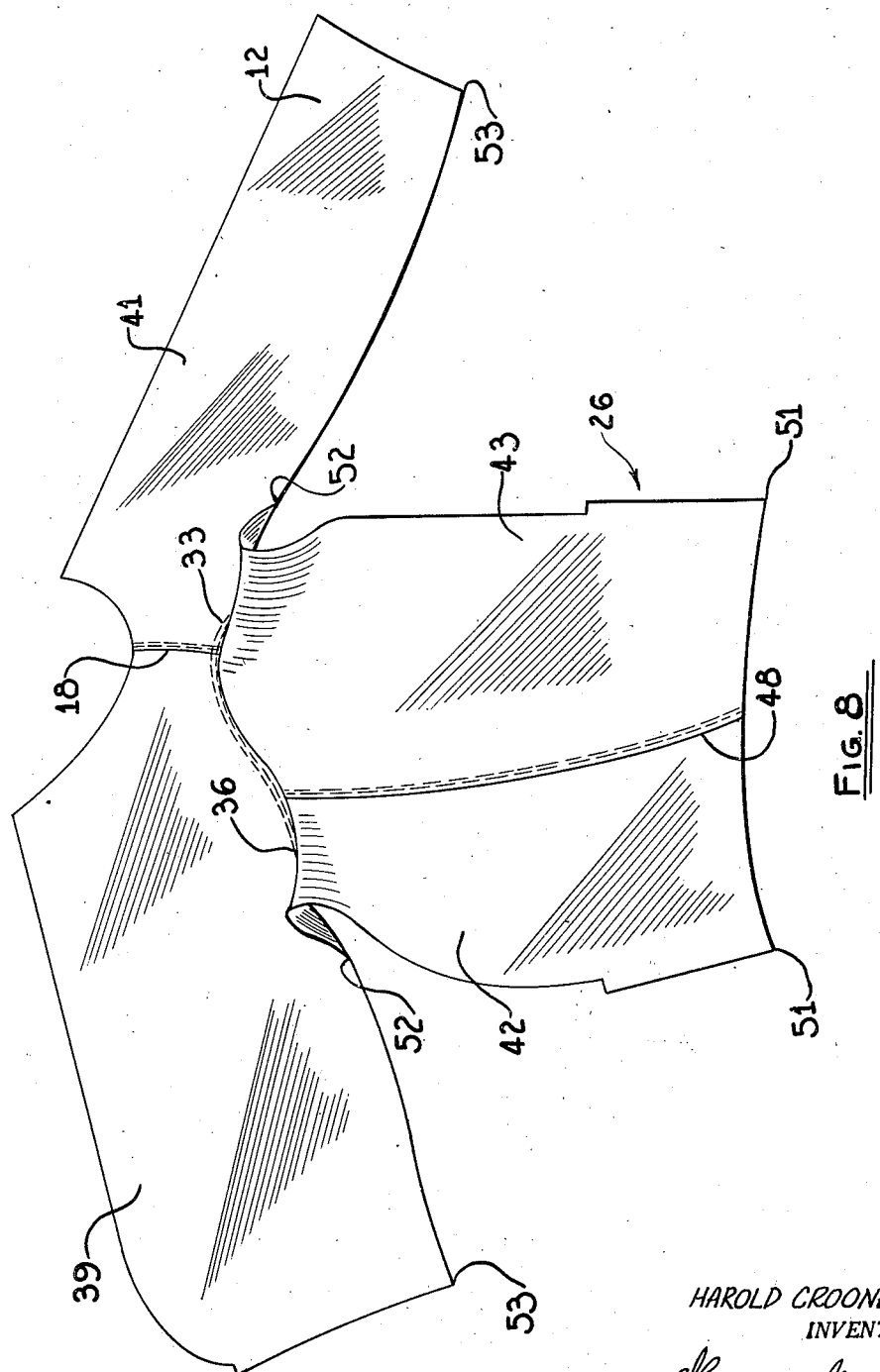

Dec. 13, 1949  H. CROONBORG  2,491,001
GARMENT
Filed April 13, 1946  5 Sheets-Sheet 5

HAROLD CROONBORG
INVENTOR.

BY *[signature]*
ATTORNEY

Patented Dec. 13, 1949

2,491,001

UNITED STATES PATENT OFFICE 2,491,001

GARMENT

Harold Croonborg, Forest Hills, N. Y., assignor to Brew-Schneider Company, Inc., New York, N. Y.

Application April 13, 1946, Serial No. 662,018

2 Claims. (Cl. 2—93)

The present invention relates to wearing apparel and more particularly to over-garments provided with sleeves. A coat has been selected as the illustrative example in the following specification of the invention.

The major aims of the invention are to simplify the work of designing the parts for a sleeved over-garment, simplify the preparation of the pattern, simplify cutting of the component parts and to simplify manufacturing of the complete garment singly or in quantities.

Another aim is to simplify the making of an over-garment by reason of the novel design hereinafter disclosed.

A further aim or object of the invention is to devise and provide an over-garment such as a coat having a continuous body and sleeve seam.

A still further object is to provide an assembling or manufacturing procedure which is novel in the art of assembling the component parts of an over-garment.

Still another object is to provide an over-garment such as a coat, which has a novel relationship of sleeve seam and body seam.

Still another object is to provide novel component parts, both in pattern form and cut cloth form, for the briefly described garment of the foregoing object.

Other and more specific objects of the invention will become apparent to those skilled in the art as the description of an illustrative example proceeds, with continued reference to the accompanying drawing in which:

Figures 2 to 5 are outline diagrams of the principal component parts of the coat of Figure 1, or of patterns to serve as cutting guides.

Figures 6 to 9 illustrate successive steps conveniently to be followed in assembling a coat embodying the invention.

Figure 1:
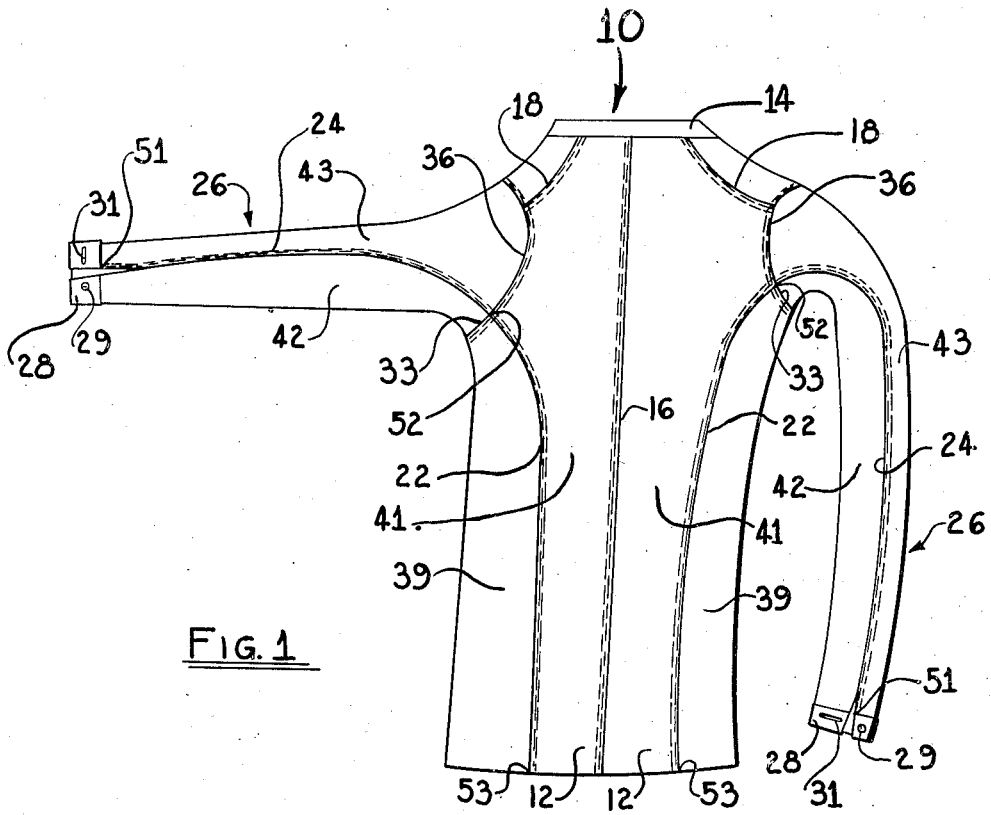
Figure 1 is a general view in rear elevation of a coat embodying the invention.

Referring to the drawings and more particularly to Figure 1 thereof, except as noted, reference numeral 10 represents the illustrative coat in its entirety. The left hand side of the garment as viewed from the rear is represented as lying flat, whereas the right hand side is indicated as being freely draped, as from a hanger. This coat 10 may be modified to suit the needs of a wearer. For example, it may be made up as a lounging garment, a uniform coat for professional use such as is worn by doctors, dentists and laboratory technicians; and a uniform coat for maids, porters and other persons requiring a uniform coat.

The skirt portion 12 of the coat 10 may be wider, if desired, when the coat is designed as a straight hanging garment. This portion 12 will be of moderate width for professional wear. However, for domestic use by porters and other persons desiring to present a smart appearance, the skirt portion 12 will be relatively narrow as shown. In short, the invention is applicable irrespective of styling.

The coat 10 may be trimmed by a collar 14 of any desired style. Also, pockets, lapels and other features of trim (all not shown) may be included in the design. As will appear hereinafter from a more detailed discussion of the component parts of the garment selected solely for illustrative purposes, the front is plain and severe in styling. However, any button scheme may be used. For the currently popular storekeeper's duck coat, two or three buttons may be used and lapels may be designed without in any way sacrificing advantages of the invention.

Continuing the general description, the rear of the coat has an intermediate seam 16, a shoulder seam 18 and an arm seam 48 (Figure 7). The feature of major importance resides in the provision of a back side seam as indicated by reference character 22, the continuation of which forms the elbow seam 24 of the sleeve 26. A cuff 28 equipped with a button 29 and buttonhole 31 is shown to serve as a sleeve trim. It will be noted that the back side seam 22 is continued to be joined with the free edges of the arm seam portions 33 and 36 continuing to form the curved elbow seam 24.

Referring now to Figures 2 to 5 of the drawings, the principal component parts are shown for one side of the coat 10. In this instance parts for the right side are shown. The reverse or mirror image of these parts will be duplicated for the left side.

Figure 2 shows the front panel 39 with the joining edges labeled. Figure 3 shows the back panel 41 with the edges labeled in a like manner. Figure 4 shows the under sleeve part 42 and Figure 5 shows the top sleeve part 43. Parts 42 and 43 have their edges labeled for convenience.

Figures 6 to 9 indicate a convenient method of assembling the parts so as to realize fully the advantages of the invention. In these figures the reference characters correspond to Figure 1 and also to those used in Figures 2 to 5.

Figure 6:
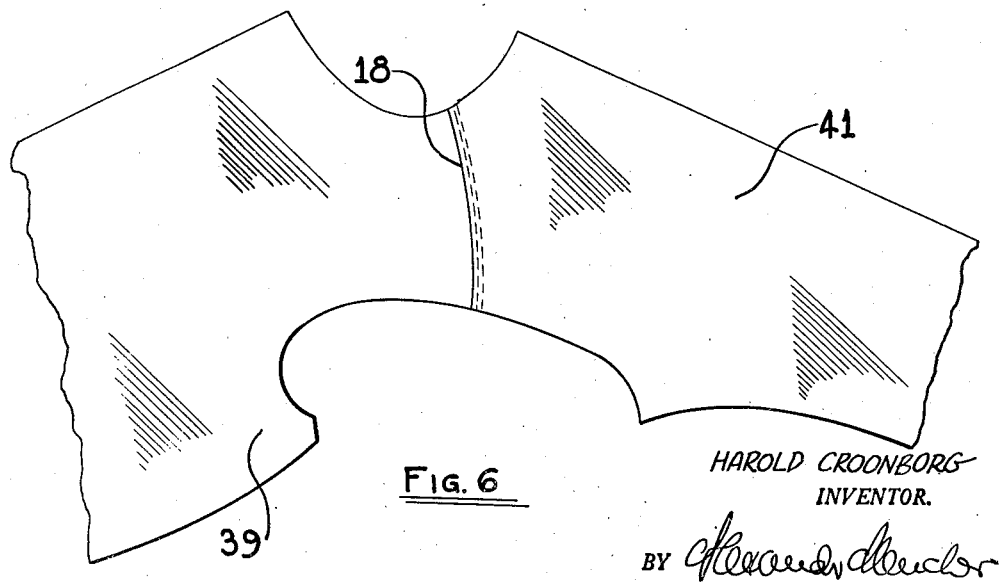

Referring to Figure 6, the first operation of assembly is shown. This consists in joining the parts 39 and 41 along the shoulder seam 18. Figure 7 shows the second assembly operation which consists in joining the under sleeve part 42 to the sleeve part 43 along the front sleeve seam 48.

Figure 8 shows the third operation in the assembly of the right side of the coat 10. For the left side, this operation is reversed. The sleeve 26, which is open at this stage and comprises the previously assembled parts 42 and 43 is sewn to the armhole of assembled parts 39 and 41.

Figure 9:
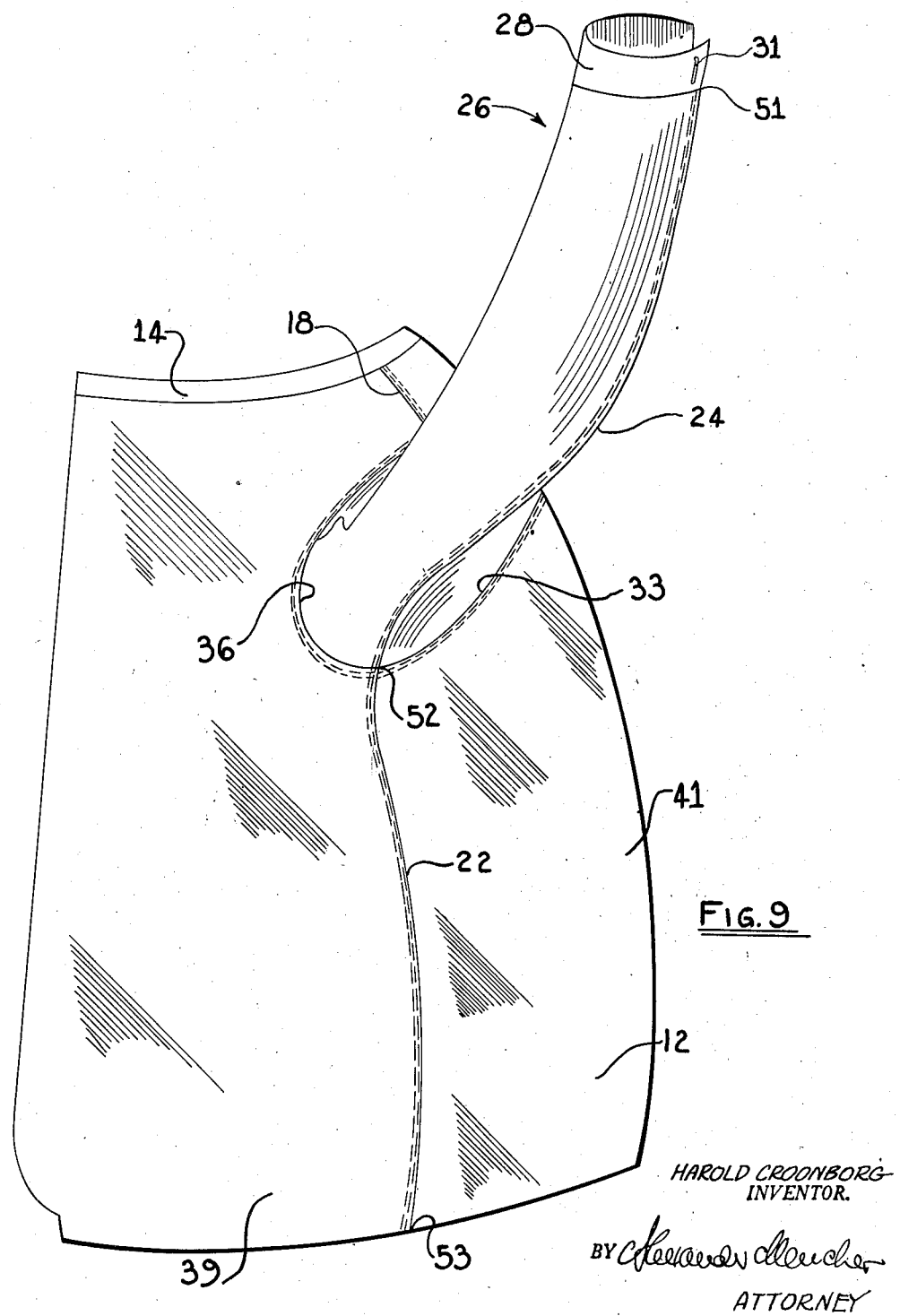

Figure 9 shows the fourth operation of assembly. This is accomplished by beginning a stitching operation at 51 (Figure 8 also) at the cuff of the sleeve, continuing down through the back sleeve past the point 52 and down the body side seam 22 to the bottom a point 53.

It will be seen that the seam begins at the back of the sleeve bottom, continues past below the elbow, then crosses over to the underarm, then crosses back and continues down through the side seam to the bottom of the body. This operation facilitates the sewing operation especially on open cuff sleeves.

In the embodiment of Figure 1, a two-needle lap seam construction is provided. It will be understood that other seam closures may be used.

Joining the two parts, each of which is constructed as shown in Figures 6 to 9 along the seam 16 completes the coat except for the trim such as a collar 14 and pockets. Pockets and other trim may be added. It is within the scope of the invention to secure patches for pockets on the part or parts 39 before or after assembly.

While "stitching" and "sewing" are referred to herein, other joining methods or devices may be employed.

I claim:

1. In a garment, a front panel and back panel, a shoulder seam connecting the front and back panels together, a sleeve, an arm hole seam connecting the front and back panels and sleeve together, and a closing seam connecting together the front and back panels and extending into the sleeve from an underarm point, said closing seam intersecting the arm hole seam at substantially right angles, and then extending into the sleeve and crossing to the rear of the sleeve and to the outer elbow region thereof and further continuing to an outer cuff opening.

2. In a garment, a back panel adapted to cover the central part of the back of a wearer, side edges of said back panel extending arcuately downwardly, the said back panel having a projection, the outer edge of which forms the rear central portion of the arm opening, a front panel having a rearward extension adapted to cover a portion of the back of the wearer, the rear side edges of the front panel being supplementarily curved to correspond to the side edges of said back panel and connected thereto, the upper side edges of said front panel having a cut out formed therein which with the outer edge of the projection of the back panel forms the arm hole of the garment, a sleeve having an edge secured in the arm hole formed by the front and back panels, said sleeve having a substantially S-shaped upper edge joined to the arm hole opening of the front and back panels, the upper edge comprising a large downwardly curved edge portion and a small upwardly curved edge portion and the side edges of the sleeve extending generally in the same direction, one of said side edges being straight and intersecting with the end of the larger downwardly curved edge portion, the other side edge of the sleeve being curved away from said straight edge and intersecting the end of the small upwardly curved small edge portion of the sleeve and a concaved edge formed at the free end of the sleeve opposite the S-shaped upper edge.

HAROLD CROONBORG.

REFERENCES CITED

The following references are of record in the file of this patent:

UNITED STATES PATENTS

| Number | Name | Date |
|---|---|---|
| 1,010,679 | Padernacht | Dec. 5, 1911 |
| 1,261,360 | Carson | Apr. 2, 1918 |
| 2,244,583 | Turner et al. | June 3, 1941 |
| 2,369,416 | Solomon | Feb. 13, 1945 |
| 2,390,456 | Nehf | Dec. 4, 1945 |